(12) United States Patent
Benisty

(10) Patent No.: US 11,392,320 B2
(45) Date of Patent: Jul. 19, 2022

(54) QUALITY OF SERVICE BASED ARBITRATIONS OPTIMIZED FOR ENTERPRISE SOLID STATE DRIVES

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/903,054

(22) Filed: Jun. 16, 2020

(65) Prior Publication Data
US 2020/0326890 A1    Oct. 15, 2020

Related U.S. Application Data

(63) Continuation-in-part of application No. 16/026,965, filed on Jul. 3, 2018, now Pat. No. 10,732,897.

(51) Int. Cl.
| | |
|---|---|
| *G06F 3/06* | (2006.01) |
| *G06F 9/38* | (2018.01) |
| *G06F 9/30* | (2018.01) |
| *G06F 9/32* | (2018.01) |

(52) U.S. Cl.
CPC .......... *G06F 3/0659* (2013.01); *G06F 3/0611* (2013.01); *G06F 3/0673* (2013.01); *G06F 9/30101* (2013.01); *G06F 9/321* (2013.01); *G06F 9/3855* (2013.01)

(58) Field of Classification Search
CPC .... G06F 3/0611; G06F 3/0659; G06F 3/0673; G06F 9/30101; G06F 9/321; G06F 9/3855; G06F 13/1668; G06F 13/4282; G06F 2213/0032; G06F 3/0679
See application file for complete search history.

(56) References Cited

U.S. PATENT DOCUMENTS

| | | | |
|---|---|---|---|
| 4,530,055 A | * | 7/1985 | Hamstra ............... G06F 12/127 |
| | | | 711/113 |
| 7,739,436 B2 | | 6/2010 | Meyer |
| 10,732,897 B2 | | 8/2020 | Benisty |

(Continued)

OTHER PUBLICATIONS

Kim et al. "Optimized I/O Determinism for Emerging NVM-based NVMe SSD in an Enterprise System," 2018 55th ACM/ESDA/IEEE Design Automation Conference (DAC), San Francisco, CA, 2018, pp. 1-6, doi: 10.1109/DAC.2018.8465867.

(Continued)

*Primary Examiner* — Zhuo H Liz
(74) *Attorney, Agent, or Firm* — Patterson + Sheridan, LLP; Steven H. Versteeg

(57) ABSTRACT

A method and apparatus for providing accurate command aging in a data storage device. A host provides multiple doorbell requests for the same command queue and a timestamp is saved for each request. When the storage device fetches the commands associated with the requests, the commands are all given the value of the timestamp associated with the requests and placed into the command queue and the aging algorithm of the storage device ages the commands. In an alternate embodiment, the commands may be assigned timestamps based on statistical values such as an average value, between the first and last doorbell request timestamps.

20 Claims, 7 Drawing Sheets

(56) References Cited

U.S. PATENT DOCUMENTS

| | | | |
|---|---|---|---|
| 2012/0331019 A1* | 12/2012 | Schreter | G06F 12/0866 |
| | | | 707/813 |
| 2016/0283119 A1* | 9/2016 | Frickey, III | G06F 3/0688 |
| 2017/0075824 A1* | 3/2017 | Haen | G06F 3/0661 |
| 2017/0123659 A1 | 5/2017 | Nam et al. | |
| 2018/0275923 A1 | 9/2018 | Earhart et al. | |
| 2018/0321844 A1 | 11/2018 | Benisty | |
| 2018/0321945 A1 | 11/2018 | Benisty | |
| 2019/0179760 A1 | 6/2019 | Bhargava et al. | |
| 2020/0012451 A1 | 1/2020 | Benisty | |
| 2020/0210104 A1* | 7/2020 | Grosz | G06F 3/0604 |
| 2020/0348889 A1 | 11/2020 | Benisty | |

OTHER PUBLICATIONS

Tavakol et al. "FLIN: Enabling Fairness and Enhancing Performance in Modern NVMe Solid State Drives," 2018 ACM/IEEE 45th Annual International Symposium on Computer Architecture (ISCA), Los Angeles, CA, 2018, pp. 397-410, doi: 10.1109/ISCA.2018.00041.

* cited by examiner

US 11,392,320 B2

QUALITY OF SERVICE BASED ARBITRATIONS OPTIMIZED FOR ENTERPRISE SOLID STATE DRIVES

CROSS-REFERENCE TO RELATED APPLICATIONS

This application is a continuation-in-part of U.S. patent application Ser. No. 16/026,965, filed Jul. 3, 2018, which is herein incorporated by reference.

BACKGROUND OF THE DISCLOSURE

Field of the Disclosure

Embodiments of the present disclosure generally relate to a quality of service for data storage devices, and more particularly to measuring quality of service based on sector and block faults.

Description of the Related Art

When a command arrives at a data storage device, the command is typically assigned to a queue to await processing and receives a timestamp indicating when it entered the queue. The command waits in the queue behind earlier and higher priority commands. As commands age in a queue, they are assigned an increasing level of priority until either the command is processed per its position in the queue, or its priority increases such that it jumps to the head of the queue and is processed.

In prior approaches, the timestamp is applied when the data storage device receives the command from a host. Because storage devices go idle for a variety of reasons, when a command is finally fetched by the storage device from the host, the command may already be aged from the perspective of the host. In these circumstances, as the command ages in the queue of the storage device, it may be timed out by the host. Commands taking overly-long to be executed, or be timed-out and subsequently re-issued by the host, cause the quality of service of the storage device to degrade from the perspective of the host. This also impacts the quality of service of the entire system encompassing the host and storage device.

What is needed are systems and methods to provide more accurate aging for commands fetched by a data storage device from a host, to account for the age of the command prior to entering the queue of the data storage device.

SUMMARY OF THE DISCLOSURE

The present disclosure generally relates to systems and methods for providing accurate command aging in a data storage device. Multiple doorbell requests are provided by a host for the same command queue; a timestamp is saved for each request. When the commands associated with the requests are fetched by the storage device, the commands are all given the value of the timestamp associated with the requests and placed into the command queue and the aging algorithm of the storage device ages the commands. In an alternate embodiment, the commands may be assigned timestamps based on statistical values such as an average value, between the first and last doorbell request timestamps.

In one embodiment, a data storage device is disclosed, including one or more memory devices and a controller comprising a first timestamp register, a command queue, and a processor configured to carry out a method for command aging. In embodiments, the method includes placing the data storage device in a non-command fetching mode, receiving a first command from a host, and recording a first timestamp in the first timestamp register corresponding to a time of receipt of the first command.

In another embodiment, a controller for a data storage device is disclosed, including a host I/O, a memory I/O coupling the controller to one or more memories, a first timestamp register, a command queue, and a processor configured to carry out a method for command aging. In embodiments, the method includes placing the data storage device in an idle mode, receiving a first doorbell request from a host, and generating a first timestamp in the first timestamp register corresponding to a time of receipt of the first doorbell request.

In another embodiment, a system for storing data is disclosed, including a memory means, and a controller means. In embodiments, the controller means includes a first timestamp register means, a command queue means, and a processor means configured to carry out a method for command aging. In embodiments, the method includes placing the system in a non-command fetching mode, receiving a first command from a host means, and recording a first timestamp in the first timestamp register means corresponding to a time of receipt of the first command.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
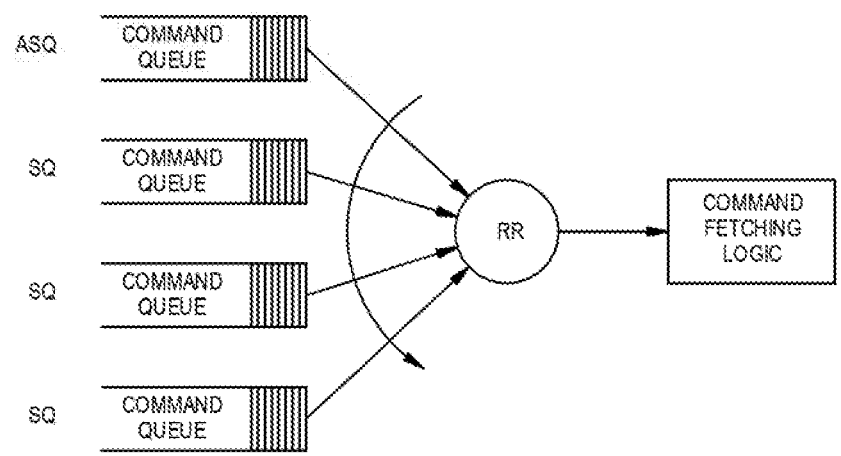
FIG. 1 is a schematic illustration of an NVMe Round Robin arbiter, according to disclosed embodiments.

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a given embodiment achieves a particular advantage is not limiting of the disclosure. Thus, the following aspects, features, embodiments, and advantages are merely illustrative and are not considered elements or limitations of the appended claims except where explicitly recited in a claim(s). Likewise, references to "the disclosure" shall not be construed as a generalization of any inventive subject matter disclosed herein and shall not be considered to be an element or limitation of the appended claims except where explicitly recited in a claim(s).

The present disclosure relates to systems and methods for providing accurate command aging in a data storage device. A host provides multiple doorbell requests for the same command queue and a timestamp is saved for each request. When the storage device fetches the commands associated with the requests, the commands are all given the value of the timestamp associated with the requests and placed into the command queue and the aging algorithm of the storage device ages the commands. In an alternate embodiment, the commands may be assigned timestamps based on statistical values such as an average value, between the first and last doorbell request timestamps.

In some embodiments, when a doorbell request is received, the storage device creates a timestamp, assigning this timestamp to the command associated with the doorbell request when the command is placed in the queue while aging the timestamp in the storage device prior to the arrival of the command.

The function of the memory arrangement is to accept data and store the data until needed again by a user or the host. The arrangement may be configured to accept bursts of data, depending on the computer process performed; therefore, the data storage arrangement is configured with multiple memory units that provide for various states of usage. Certain sections of the data storage arrangement are configured of memory systems that provide for fast action (low latency) so that computer processes may be conducted at a rapid pace. Such low latency performance may be accomplished by single-layer cell (SLC) memory configurations. If bulk amounts of data are required to be stored, multiple layer cell memory configurations may also be present, such as triple-layer cell (TLC) memory configurations. The data storage arrangement may have an interface that allows the data storage arrangement to connect with the host computer. The interface may, for example, be a SAS Interface or Serial ATA (SATA) compatible interface, as non-limiting embodiments. The memory storage may have a configuration to allow for plug and play capability. Although described as having a SATA compatible interface, the memory storage device may be provided with a configuration that allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SATA compatible, other types of interfaces may be used.

Auxiliary connections may be provided to the data storage arrangement to allow for additional options for inputting data directly to the data storage arrangement without interfacing with the host. Such direct input of data may be provided through the placement of an integrated secure digital card to offload or copy data. Other auxiliary connections may be provided for additional input/output operations. Such connections may be USB 2.0, USB 3.0, Firewire, or other hard-wired configurations. Gigabit Ethernet interfaces and connections may also be used.

The data storage arrangement may be configured with a separate power supply or may be run through other power supply, such as from a computer motherboard. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera, or other configuration. The data storage arrangement may also have a battery indicator to allow a user to understand the amount of charge in the data storage arrangement from a visual inspection. Such battery indicators may be, for example, low energy consumption light-emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use. The controller, for example, may be an application-specific integrated circuit (ASIC) or other configuration that accepts commands from a host and then controls operations of the solid-state drive or memory arrangement.

Internal software may be provided with the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smartphones, stereo audio systems. The internal software may also be provided such that the access of data may be performed by cloud applications designed for interface with the data storage arrangement.

The internal software of the data storage arrangement may also be configured to provide for the security of the data storage arrangement.

Safeguarding of material provided on the data storage arrangement prevents unauthorized access to sensitive information contained on the system. Security protocols may take several forms. Protocols may be in the form of password protection, such as a Wi-Fi password protection. In embodiments, software may be used in conjunction with the data storage arrangement to allow the data storage arrangement to create a hardware lock. Such hardware locks, for example, may prevent access to a host computer through a universal serial bus connection.

Memory arrangement software may also provide other benefits. Such benefits can include diagnostic support of the memory arrangement. Data obtained may be directly supplied to a user or may be fed into other types of software that may analyze obtained data. In one example configuration, two different modes may be provided. A first mode may provide a quick test software program that may be provided with the capability to check the data storage arrangement for major performance problems. A second mode may provide a full test mode, which may also be provided to provide detailed status information to a user. Data may be provided to the user which may include, for example, a firmware version of the software, a total amount of memory of the data storage arrangement, the amount of memory storage used, storage divisions provided on the data storage arrangement, memory block errors, energy usage, age of the device and similar data.

The internal software may also be used as a server system wherein in certain embodiments, Digital Living Network Alliance (DLNA) enabled software is incorporated. Such software allows for quick file transfer and error-checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems or other data storage systems. In the event that the data storage arrangement approaches the limits of storage capability, the data storage arrangement may allow for some of the data to be stored on cloud-based systems or other data storage systems. The selection of data to be stored on such external storage systems may be governed by the controller, which is configured to determine what sections of data may be appropriately stored in cloud-based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting example embodiments. Different form factors may also be provided. In the illustrated embodiment, a form factor of 2.5 inches is provided. Other form factors, such as 1.8 inch or 3.5 inch may also be used. Compatibility of the data storage arrangement may be provided for Windows operating systems, Windows Server, Linux and Mac OS, as non-limiting example embodiments. Supported browsers for the storage system may be, in non-limiting example embodiments, Internet Explorer, Safari, Firefox and Google Chrome.

Software may also be included in the system to allow for quick and automatic backups of data according to user prescribed requirements. Such backup ability may be compliant with operating-system based backup and restore functions. Furthermore, software may be provided to add more than one user to the storage system. Users can be added or deleted according to an administration account. Such administration account may also allow for restricted access for certain users according to administration requirements.

Aspects of the disclosure relate to NVMe systems and the processing of commands that are received, for example, from a host. In NVMe systems, the processing of commands generally follows a sequence of phases. In a first phase, the host device (a computer, cell phone, or other computing devices) places a command in a submission queue (SQ) and thereafter notifies the memory device that the command has been placed in a submission queue. The NVME system reacts to the notification by the host device, and the NVMe fetches the command from the submission queue. Thereafter, the NVMe processes the command according to the needs of the host. In one non-limiting embodiment, the memory device performs internal command selection and then executes the command. The command may be a performance of a read or write command. After processing the command, the memory device places an entry on the completion queue, with the entry indicating that the execution of the command has completed. The memory device then generates an interrupt command to the host device, indicating that an entry has been placed on the completion queue. After the placement of the command on the completion queue, the host device reviews the data on the completion queue. The host device then notifies the memory device that the entry on the completion queue has been reviewed.

A host device may use and configure multiple submission queues to aid in processing. The host device may place commands on respective submission queues, which are then handled by the storage device and controller of the storage device. To enable the storage device to choose which command on a submission queue to process, the memory device may use one or more arbitration schemes in order to determine the order of the commands to fetch from the multiple submission queues. One type of submission queue is an administrative submission queue, which includes administrative commands to the memory device. Other queues may be I/O submission queues.

In certain embodiments, the administrative submission queue may be assigned a high priority (or the highest priority relative to other submission queues). The other submission queues, however, may be priorities that are lower than the administrative submission queue. The priority of the commands may proceed in the following order (in decreasing order of priority): urgent, high priority, medium priority, and low priority. Commands on other submission queues may relate to data transfer, such as read commands (e.g., reading data from the flash memory) and write commands (e.g., writing data to the flash memory). The host device may assign a respective priority to a submission queue at the initialization of the submission queue.

In determining which commands to fetch from the submission queues, an algorithm may be used. In one example embodiment, the memory device may use an arbitration algorithm, such as a round-robin algorithm or a weighted round-robin algorithm. These algorithms may determine the order in which to fetch commands from multiple submission queues as well as administrative queues. For example, using the round-robin algorithm, the memory device selects the commands placed in the different submission queues in a symmetrical manner. The round-robin algorithm fetches commands from the different queues in a predetermined order regardless of the priority of the submission queue. With the weighted round-robin approach, however, the memory device selects the commands placed in the different submission queues in a non-symmetric way in which each submission queue has its own priority assigned by the host device at the initialization phase.

In one non-limiting embodiment, a weighted round-robin algorithm may determine if there is a command that is urgent. The command may be placed in the administrative submission queue or an I/O submission queue. If there is no command that is noted as urgent, then the weighted round-robin algorithm may weight commands on "high priority," "medium priority," and "low priority" submission queues to determine which commands to fetch (e.g., weight the commands on the "high priority" submission queues higher than the commands on the "medium priority" or "low priority" submission queues).

In another non-limiting embodiment, the memory device may use a static arbitration algorithm, such as a round-robin approach, in which certain queues are given higher priority than other queues. For example, fetching commands from an administrative submission queue may be given higher priority than fetching commands from other submission queues, not designated as an administration queue since the administrative queue is assigned the highest priority.

In one implementation, the memory device may determine a priority for performing the phases after fetching the command(s) from the queues. As provided above, example phases after fetching include: processing the command (e.g., performing internal command selection, executing the command, such as data transfer), posting the completion message; and generating an interrupt to the host device indicating that an entry has been placed on the completion queue. The listed phases after fetching are merely for illustrative purposes.

The memory device, such as an SSD, may determine priority for a command (or for performing one or more phases) based on one or more criteria including any one, any combination or all of the following: (1) priority of the respective command; (2) internals of the memory device (e.g., the state of the die or the processing capability of the memory device, as discussed below); (3) power consumption; (4) state of the communication interface between the host device and the memory device (e.g., the status of the ingress and/or egress path); and (5) the phases of the commands subject to execution. As a result, commands may be executed based on a basis other than the time that a command was received. Different priorities may be placed on the above-identified criteria. For example, if the SSD is located within a laptop computer where battery energy is rapidly diminishing, power consumption parameters may be the most important priority factors. Thus, delaying of the commands that use excessive power may be appropriate for a user.

The memory device may determine the priority of the command according to several methods. In a first method, a command priority may be determined based on the respective submission queue on which the command was placed. In differing implementations, upon initialization of a particular submission queue, the host device may assign a priority to the particular submission queue. Thereafter, the memory device may determine the particular submission queue on which the command was placed, and assign the priority of the particular submission queue to the respective command. A host device may configure an administrative submission queue upon initialization and assign the highest priority, as discussed above, as such administrative submission queue activities may be needed to be performed prior to conducting other less critical activities. In other specific implementations, the memory device may determine the priority for a respective completion queue based on the priority of the submission queue that is associated with the respective completion queue.

The memory device is configured to determine a priority of the commands given to it based on one or more aspects of the command. As a first example, the memory device may use a Logical Block Address to determine the priority of the respective command. For example, the memory device may assign a specific priority to a command that includes an address within a given range that is frequently accessed by the memory device, than to other commands outside of a specific address range. In this example, commands that require access to specific ranges are processed more quickly.

In a second example, a type of command may be used to provide instruction to the memory device on the level of priority for the command. For example, a forced unit access (FUA) command is a command that instructs the memory device to store data to the flash memory (as opposed to storing the data in cache). In specific embodiments, the memory device may treat an FUA command as urgent as the memory device cannot post an entry to the completion queue for this command until the data is stored in the flash memory. The memory device controller, for example, may include a table that correlates types of commands to levels of urgency.

In a third example, the memory device may prioritize the command based on the size of the data transfer of the command. In particular, the memory device may prioritize commands that dictate that small amount of data to be read from flash memory as opposed to comparatively larger amounts of data. In a fourth example, the memory device may analyze randomness of at least one aspect associated with the command, and determine, based on the analyzed randomness of at least one aspect associated with the command, and determine, based on the analyzed randomness, the priority of the command.

In one example embodiment, a device, such as a memory device, analyzes the memory location (or set of locations) that are the subject of a read command. In response to determining that the memory location(s) are random (no pattern of reading from this memory location), the memory device may assign a specific priority to the command. As an example, the specific priority may be a high priority. Thus, in one implementation, a higher degree of randomness of a command may indicate a greater importance to the host device compared to non-random commands, and therefore correlates to a higher priority assigned for the random command by the memory device.

One phase after a fetching operation is an internal command selection, which may comprise (1) command queuing and (2) command scheduling. In one implementation, the internal command selection may be performed by the memory device based on internals of the memory device, such as the internal state machine of the memory device and/or the internal states of the flash die(s). As an example, a die of the flash memory may be in one of several states and may unavailable for performing operations. For example, which data is being written to a flash die, the flash die is in the program state and cannot be accessed.

In another embodiment, if the flash die is performing garbage collection, the flash die may be unavailable. Execution of commands, such as read or write commands, is dependent on the state of the particular die. The memory device controller may execute the commands on flash dies that are available for operation. In a like manner, the memory device controller may delay execution on flash dies that are unavailable.

In another implementation, the memory device controller may select the phase of operation based on the processing capacity of the memory device controller. As discussed herein, reads from the flash memory may further include error correction, encryption or decryption, and the like. The operations of these commands and functions may be computationally intensive. As such, depending on the current processing capacity of the memory device controller, the memory device controller may select phases of operation. For example, in response to determining that the memory device controller's current processing capacity is reduced, the memory device controller may select phases of operation that are less computationally intensive (such as sending a read request to the host device). In response to determining that the memory device controller has available processing capacity, the memory device controller may select phases of operation that are more computationally intensive; the memory device controller may select phases of operation that are more computationally intensive (such as reading data from the flash memory, performing error correction and decryption).

In still another implementation, the memory device controller may arbitrate amongst commands that are in the same phase. Such arbitration may be accomplished through arbitration arrangements placed within the controller. For example, a set of commands may be in the execution phase, such as performing a write to or a read from the flash memory. The memory device controller may prioritize all commands that are operating in a particular phase (such as the execution phase). Alternatively, the memory device controller may prioritize a certain type of command that is operating in a particular phase (such as all read commands in the execution phase or all write commands in the execution phase).

In another non-limiting embodiment, the memory device may perform an internal command selection based on a priority associated with the command. As discussed above, priority may be determined in one of several ways, including, for example, the priority of the submission queue from which the command was fetched, the type of command, or the address range of the command. In some implementations, the memory may perform the internal command selection based on both the priority associated with the command and the internals of the memory device (e.g., the internal state machine of the memory device and/or the internal states of the flash die(s)).

NVM Express is based on a paired submission and completion queue mechanism. Commands are placed by host software into a submission queue in the host and then transmitted to a solid-state drive, for example. Completions (actions that are completed by the SSD) are placed into the associated completion queue by the controller of the SSD. Submission and completion queues are allocated in host memory.

Enterprise SSD markets have different requirements, especially in quality of service (QoS) requirements. QoS is extremely important in enterprise operations, and therefore strict requirements are defined. Several benchmarks have been established to test devices, such as SSDs, to ensure users have good results in specific areas. One example of these types of requirements is the latency of input/output (I/O) commands. In SSDs, generally, there are strict requirements in performance, but not in latency. In one example embodiment, requirements or benchmarks are established for random read commands. In this example embodiment, 99 percent of the commands should be completed in 300 µS while 99.9% of the commands should be completed in 400 µS. As provided in Table 1 below, a maximum timeout value is also provided. Furthermore, the number of operations needed in a specific test is provided in the right column. The center columns provide the number of µS needed under 4 kB, 8 kB, and 64 kB processing.

TABLE 1

|  |  | 4 kB (µs) | 8 kB (µs) | 64 kB (µs) | Operations Needed in Test* |
|---|---|---|---|---|---|
| Average |  | 240 | 250 | 450 | — |
| 99% | (2 nines) | 300 | 360 | 770 | >100 |
| 99.9% | (3 nines) | 400 | 380 | 1,000 | >1,000 |
| 99.99% | (4 nines) | 500 | 550 | 3,000 | >10,000 |
| 99.999% | (5 nines) | 1,000 | 2,000 | 3,500 | >1e5 |
| 99.9999% | (6 nines) | 3,000 | 4,000 | 5,000 | >1e6 |
| 99.99999% | (7 nines) | 5,000 | 6,000 | 8,000 | >1e7 |
| 99.999999% | (8 nines) | 7,000 | 8,000 | 10,000 | >1e8 |
| Maximum Timeout |  | 11,000 | 12,000 | 20,000 | — |

According to Table 1, the percentages of completion are extremely high over a longer-term test. Aspects herein provide for a storage device that is highly optimized to achieve the requirements in Table 1, while not significantly impacting other criteria such as performance, power, and area. By logically processing needed commands, while delaying other, less necessary, commands, overall processing is improved for the user. Such processing methods are substantially different than conventional processes that do not use informed or prioritized markers or flags on commands signifying the need for urgent processing.

Aspects described herein do not add parallelism interconnections or logical arrangements to achieve the requirements of Table 1. A device controller that is adaptive and optimized for QoS in each step of the processing pipeline, from initiation to posting of an interrupt to a host, is provided. For each command, the device controller captures a timestamp of a host issuing a relevant command "doorbell". A first phase of the pipeline involves a fetch command. An aging algorithm may also be added to the NVMe queue arbitration algorithm so QoS requirements are not lost. The next phase in the pipeline is command selection. At this phase, the selection of the next command for execution is based on an intelligent QoS algorithm. All pending commands are evaluated and classified into specific classes.

In a non-limiting embodiment, "Class A" commands may represent 99% of the commands (which must be completed in a range of between 300-400 µS). In a separate class, "Class B" commands account for a smaller percentage of commands, for example, 0.9% (which must be completed within the 300-400 µS timeframe). The above classifications may be based on evaluation and prediction and impacted by SLC/TLC zones, last access time, and a doorbell timestamp. The command selection algorithm may take all of these factors into account. Arbitration may be implemented in each phase in the pipeline stages while each phase in the pipe has more knowledge and therefore, can adapt the arbitration by delaying or providing higher priority to specific operations.

FIG. 1 is a schematic illustration of an NVMe Round Robin arbiter, according to one embodiment. Four (4) different command queues are illustrated, providing input into the Round Robin (RR) arbiter. One of the inputs comes from an administrative queue (ASQ), and three of the inputs are provided from submission queues (SQ). As illustrated in FIG. 1, the Round Robin arbiter selects among the different command queues in a symmetric way.

Figure 2:
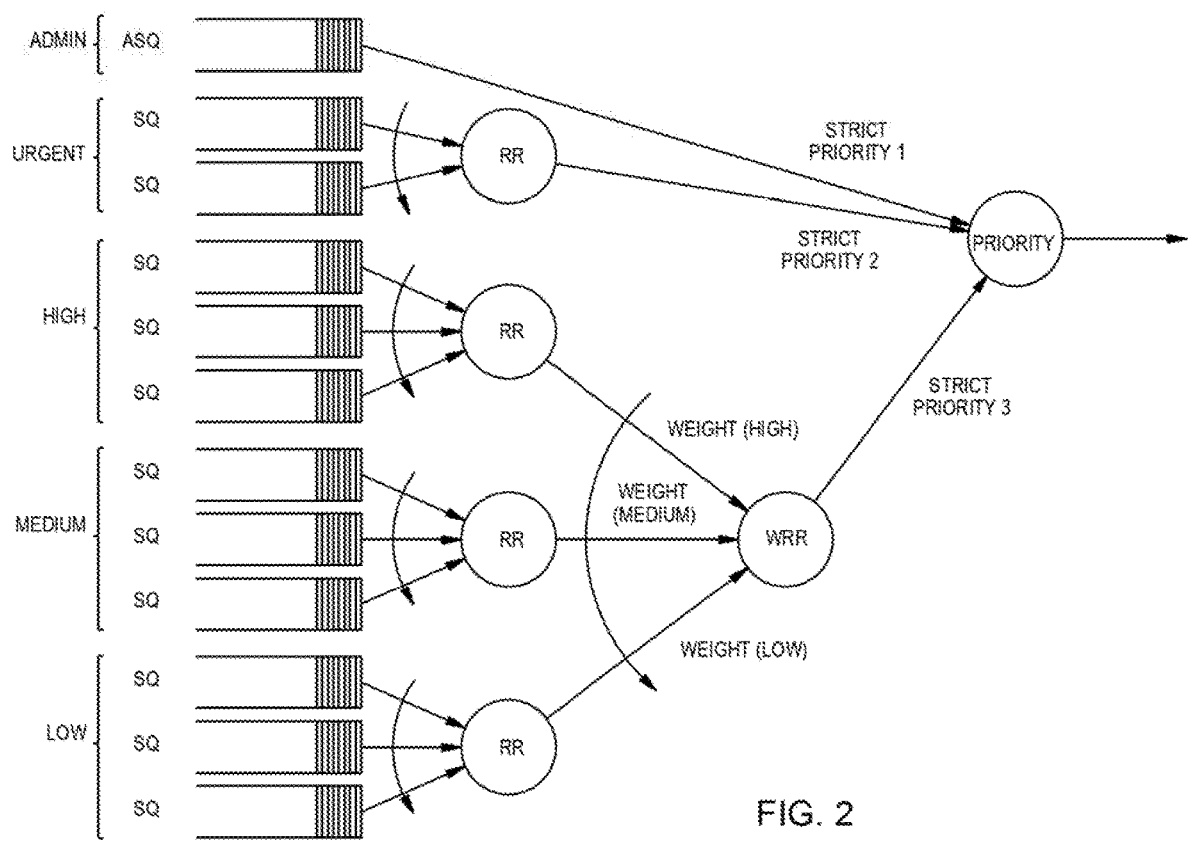
FIG. 2 is a schematic illustration of an NVMe Weighted Round Robin (WRR) arbiter, according to disclosed embodiments.

FIG. 2 is a schematic illustration of an NVMe Weighted Round Robin (WRR) arbiter, according to one embodiment. The algorithm associated with this arbiter selects between different host SQs in a non-symmetrical manner wherein each queue has its own priority assigned by a host at the initialization phase. In order to achieve results that are consistent with user expectations, commands are broken into urgent, high priority, medium priority, low priority, and an ASQ section. ASQ's proceed under strict priority 1, the highest priority possible. Urgent SQ are sorted through a RR arbiter and are designated as strict priority 2, or the next highest possible priority. High priority SQ's, medium priority SQ's and low priority SQ's are processed through their own respective RR arbiter and then weighted as input into a WWR arbiter. The results from the WRR are designated as strict priority 3. The WRR arbiter and the RR arbiters, described as element 3 330 below, in one embodiment, are part of the device controller 324.

Non-volatile memory standards do not define arbitration algorithms implemented in a device controller, such as an SSD controller, for internal operations. Aspects described herein disclose having QoS based arbitrations in the device controller, as described later. These QoS based arbitration based pipelines are optimized for providing superior QoS operations, especially for enterprise operations. At each stage in a pipeline, where a decision must be made on which operation should be performed, arbitration is performed, and the arbitration algorithm takes into account the QoS requirements. All pending commands are evaluated and classified into specific classes. In one non-limiting embodiment, three (3) different types of classifications may be made. Class A, for example, represents 99% of the commands (which must be completed in 300 μS), Class B represents 0.9% of the commands (which must be completed in the range of 300-400 μS), Class C represents 0.09% of the commands (which must be completed in the range of 400-500 μS). Other or different classifications may be made, and the separation of commands into three different classes is merely illustrative. For example, if specific commands are known to affect performance more than others, but competing commands are noted as class B, then differing factors may be used in ultimately scheduling the commands that are affecting performance to a greater degree first. The arbitration logic selects the next command based on the classification and the remaining time to achieve the goals of, for example, Table 1. The evaluation and command classification is based on the parameters discussed below.

Command Classification Parameters

1) Doorbell timestamp—this represents the time the device controller gets a "doorbell" notification from the host associated with this specific command.
2) SLC/TLC zone—this parameter represents where the relevant user data is stored in the NAND is in SLC or TLC. SLC and TLC zones have different parameters such as latency time and bit error rate and are therefore considered in classification.
3) Die Utilization—die utilization may have an impact on the classification. If the die is currently fully utilized, the next command that uses this die will have longer latency. Thus, if commands are specifically destined for specific dies, rerouting or delay of other less important commands may take place to ensure speed of operation.
4) BER—(bit error rate) for the relevant physical address is considered since the higher the BER is, increased processing time is needed for error correction.
5) Device Triggered Operations—some scheduled internal long operations such as erase, garbage collection, and relocations may affect the classifications as well.

Current timestamp—this represents the current timestamp. This value minus the doorbell stamp represents the time passed since the host queued this command.

Based on the above parameters, the commands are classified. Based on these classifications, the arbitration is done while taking into account the remaining time for each pending command. Once a command is classified, the algorithm tries to complete the command in a maximum allowed value while providing other commands higher priority. For example, if a command is classified in Class C (i.e., must be completed in the range of 400-500 μS), the algorithm is optimized to complete this command before the 500 μS passes, but not necessarily before 400 μS, thereby surpassing Class B commands. Such scheduling allows for other commands to be completed. As one will understand, however, if no other commands are scheduled to be completed prior to the 400 μS mark, the Class C commands may be executed immediately.

Figure 3:
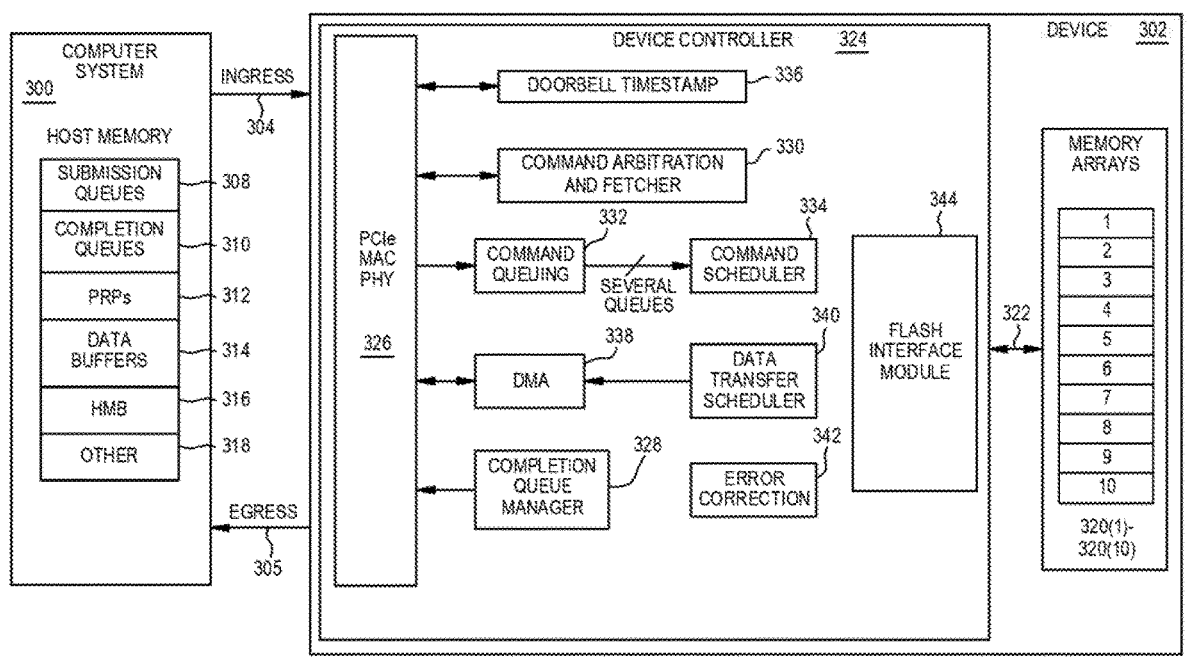
FIG. 3 is a schematic block diagram of a host computer system connected to a device, according to disclosed embodiments.

FIG. 3 is a schematic block diagram of a host computer system 300 connected to a device 302, according to one embodiment. The host computer system 300 provides an output which is classified as an ingress 304 to the device 302. The host computer system 300 also accepts an egress 305 from the device 302. In the illustrated non-limiting embodiment, device 302 is a NAND based SSD. The host computer system 300 has a host memory that has submission queues 308, completion queues 310, Physical Region Pages (PRPs) 312, data buffers 314, host memory buffers (HMB) 316 as well as other 318 memory components.

The device 302 is configured to store data within different memory arrays 320(1) through 320(10). Although shown as having ten (10) different arrays, more or fewer arrays may be provided. Data input and output from the memory arrays 320(1) through 320(10) is provided through a data line 322. Such input and output pass to a device controller 324.

The device controller 324 has several components to allow for the processing of commands. Ingress 304 and egress 305 to the device 302 from the host computer system 300 is performed through a PCIe MAC PHY interconnection 326. If commands have been completed by the device controller 324 as specified by a completion queue manager 328, then data may be transferred through the PCIe MAC PHY interconnection 326 to the completion queues 310 present in the host computer system 300.

Commands sent from the host computer system 300 that were originally placed in the submission queues 308 pass to the ingress 304, the PCIe MAC PHY interconnection 326, are timestamped by the doorbell timestamp arrangement 336 and then continue to the command arbitration and fetcher 330. The commands are arbitrated according to a selected scheme and then sent to command queueing 332 through the PCIe MAC PHY interconnection 326.

Several queues may be used or filled when the command queueing 332 performs arbiter activities. A connected command scheduler 334 may then schedule activities to be performed by the device 302 based upon the command queuing. When commands are received from the submission queues 308 through the ingress 304 through the PCIe MAC PHY interconnection 326, a doorbell timestamp may be attached by a doorbell timestamp arrangement 336 to aid in the command arbitration 330 to ensure that the performance of commands is proper in relation to Table 1, as a non-limiting example.

After a command has been scheduled through the command scheduler 334, access to memory units may be performed through a direct memory access arrangement 338. In order to ensure that data is transferred effectively and not subject to latency, data transfers may be scheduled through a data transfer scheduler 340 that feeds information to the direct memory access arrangement 338.

Error checking may be provided by the device controller 324 to ensure that the data provided to the host computer system 300 is free from errors. An error checking arrangement 342 may use different types of error checking schemes in order to ensure that the data is correct. In one non-limiting embodiment, a parity check may be accomplished for the data. Other types of embodiments are also possible. The error checking arrangement may also use a checksum routine. In still further embodiments, a cyclic redundancy check may be performed by the error checking arrangement 342.

The interface between the device controller 324 and the memory arrays 320(1)-320(10) is controlled through a flash interface module 344. The flash interface module 344 is configured to interface with the individual type of memory array provided. As will be understood, memory arrays may be NAND based or NOR based; therefore the type of flash interface module 344 is chosen according to the array used.

Figure 4:
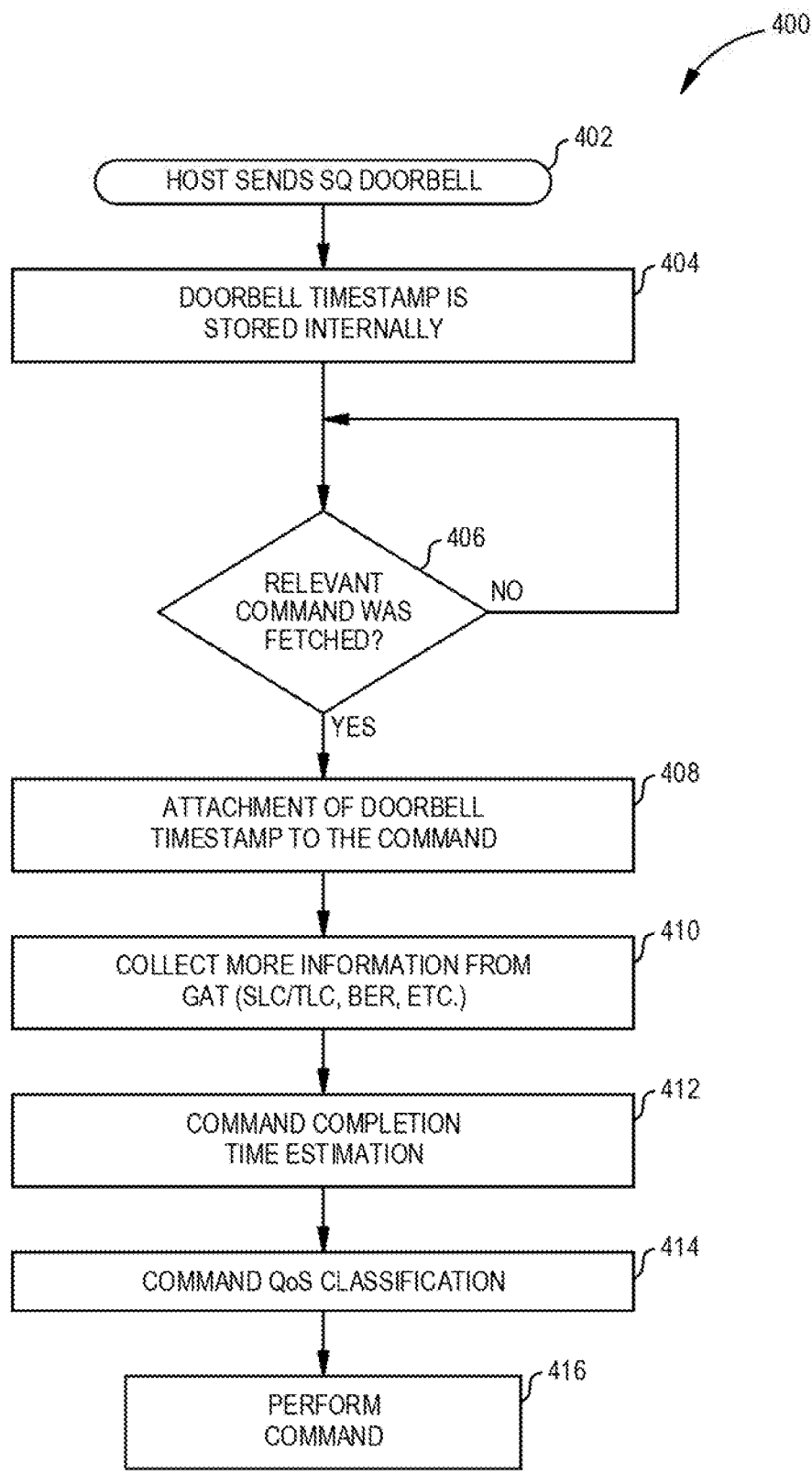
FIG. 4 is a method for performing a QoS based arbitration for an SSD, according to disclosed embodiments.

FIG. 4 is a method 400 for performing a QoS based arbitration for an SSD, according to one embodiment. At 402, a host sends an SQ doorbell to the SSD. At 404, the doorbell, which has been timestamped, is stored internally of the SSD. At 406, a query is run to determine if a relevant command was fetched. If no relevant command was fetched, then the method loops back to 406. At 408, if a relevant command was fetched at 406, then the doorbell timestamp is attached to the command. At 410, more information is collected from GAT. Such information may relate to (SLC/TLC, bit error rate, etc.). At 412, the command completion time is estimated. At 414, the command quality of service classification is provided. At 416, the command is performed according to the command QoS classification and scheduling operations.

In order to increase the performance of the solid-state drive, the device may execute several commands in parallel. In non-limiting embodiments, the device may send several PRP fetching requests which are associated with different NVMe commands. In the prior art, the arbitration mechanism was based only on the internal device states, such as, for example, memory array status. Aspects of the disclosure herein involve taking into consideration the QoS requirements while evaluating and classifying all pending commands and acting accordingly.

In NVMe, there may be several read requests generated by the host device to read data that is present within a memory array of the device. There may also be several write requests (as generated by the host device) to write data to a memory array of the device. The memory device and the host device may communicate using a transaction layer packet (TLP) request, as a non-limiting example. In one example (with the SQ resident on the host device), responsive to a TLP write request (sent via the ingress 304) by the host computer system 300 to the doorbell timestamp arrangement 336 on the memory device (with the write to the doorbell register indicating that there is a command on the SQ), the memory device uses a TLP read request (sent via the egress path) to fetch the write command from the SQ (which is resident on the host computer system 300). The write command is a request for the memory device to write data to the non-volatile memory. The memory device then parses the write command for information, such as an indication of a PRP pointer to a PRP list. For definitional purposes, the PRP list is a series of information, such as pointers or addresses, that indicate the location of the data in the host device. The memory device may then use another TLP read request to read data from the pointers or address in the PRP list. Thereafter, the memory device performs the write command by storing data in non-volatile memory (e.g., flash memory) on the memory device. After storing the data in the non-volatile memory, the memory device uses a TLP write request to write an entry to the completion queue (CQ) (indicating that the write command has been completed). The memory device may use a TLP write request to generate an interrupt to the host device, with the interrupt signaling to the host device that there is an entry on the CQ. Responsive to the interrupt, the host device reads the entry on the CQ and then issues a TLP write request to the CQ doorbell write register indicating that the host device has reviewed the entry on the CQ. In the embodiment provided above, the CQ and SQ may be resident in the device 302, such as in a controller memory buffer.

In another example (again with the SQ and the CQ resident on the host device), responsive to a TLP write request by the host to the doorbell register on the memory device (with the write to the doorbell register indicating that there is a command on the SQ), the memory device uses a TLP read request to fetch the read command from the SQ (which is resident on the host device). The read command is requested for the memory device to read data from the non-volatile memory and to send the read data to the host device. The memory device then reads the non-volatile (e.g., flash memory) to read the data. The memory device can perform a series of operations on the data, such as error correction, encryption/decryption, etc., with storage buffers interspersed between each of the serial operations. The read command may then be parsed for information, such as an indication of a PRP to a PRP list. The PRP list is a series of information, such as pointers or addresses, that indicates the location in the host device to store the data that was read from non-volatile memory (and optionally error corrected, encrypted, etc.). The memory device may use a TLP read request to read data from the pointers or addresses in the PRP list. Afterward, a TLP write request is used to write the data that was read from non-volatile memory. After writing the data to the host device, the memory device uses a TLP write request to write an entry to the CQ (indicating the read command has been completed). The memory device then uses a TLP write request to generate an interrupt to the host device, with the interrupt signaling to the host device that there is an entry on the CQ. Responsive to the interrupt, the host device reads the entry on the CQ, and then issues a TLP write request to a CQ doorbell write register indicating that the host device has reviewed the entry on the CQ.

In the embodiments provided, any suitable type of memory may be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read-only memory ("EEPROM"), flash memory (which can also be considered a subset of EEPROM), ferroelectric random access memory ("FRAM"), and magnetoresistive random access memory ("MRAM") and other semiconductor elements capable of storing information may be used. Each type of memory device may have different configurations. For example, flash memory devices may be configured in a NAND or a NOR configuration.

The memory devices can be formed from passive and/or active elements. Combinations may also be used. By way of a non-limiting example, passive semiconductor memory elements include ReRAM device elements, which in some embodiments include a resistivity switching storage element, such as an anti-fuse, phase change material, etc., and optionally a steering element, such as a diode, etc. Further, by way of a non-limiting example, active semiconductor memory elements include elements containing a charge storage region, such as a floating gate, conductive nanoparticles, or a charge storage dielectric material.

Multiple memory elements may be configured so that they are connected in series. In such configurations, each element may also be individually accessible. By way of a non-limiting example, flash memory devices in a NAND configuration (NAND memory) may contain memory elements connected in series. A NAND memory array may be configured so that the array is composed of multiple strings of memory in which a string is composed of multiple memory elements charging a single bit line and accessed as a group. Alternatively, memory elements may be configured so that each element is individually accessible, e.g., a NOR memory array.

The semiconductor memory elements may be two or three-dimensional types of arrangements. The embodiments, therefore, are therefore not limited to a specific arrangement for the memory elements.

In a two-dimensional memory structure, the semiconductor memory elements are arranged in a single plane or a single memory device level. In a two-dimensional memory structure, for example, memory elements are arranged in a plane (e.g., in an x-z direction plane), which extends substantially parallel to a major surface of a substrate that supports the memory elements. As a non-limiting example, the substrate may include a semiconductor such as silicon.

The memory elements may be arranged in the single memory device level in an ordered array, such as in a plurality of rows and/or columns. In other configurations, the memory elements may be arrayed in non-regular or non-orthogonal configurations. The memory elements may each have two or more electrodes or contact lines, such as bit lines and word lines.

In embodiments where there is a three-dimensional memory array, the three-dimensional memory array is arranged, so that memory elements occupy multiple planes or multiple memory device levels, thereby forming a structure in three dimensions (i.e., in the x, y and z directions, where the y-direction is substantially perpendicular, and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y-direction) with each column having multiple memory elements in each column. The columns may be arranged in a two-dimensional configuration, e.g., in an x-z plane, resulting in a three-dimensional arrangement of memory elements with elements on multiple vertically stacked memory planes.

By way of non-limiting example, in a three dimensional NAND memory array, the memory element may be coupled together to form a NAND string. Other three dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

In a monolithic three-dimensional memory array, one or more memory device levels may be formed above a single substrate. Optionally, the monolithic three-dimensional memory array may also have one or more memory layers at least partially within the single substrate. As a non-limiting example, the substrate may include different semiconductor materials, such as silicon. In a monolithic three dimensional array, the layers constituting each memory device level of the array are typically formed on the layers of the underlying memory device levels of the array. Layers of adjacent memory device levels of a monolithic three-dimensional memory array may be shared or have intervening layers between memory device levels.

Two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be removed or reduced from the memory device levels before stacking, but as the memory device levels are initially formed over separate substrates, the resulting memory arrays are not monolithic three-dimensional memory arrays. Further, multiple two-dimensional memory arrays or three-dimensional memory arrays may be formed on separate chips and then packaged together to form a stacked-chip memory device.

Circuitry may be required for the operation of the memory elements and for communication with the memory elements. As a non-limiting example, memory devices may have circuitry used for controlling and driving memory elements to accomplish functions such as programming and reading. As another example, a controller for memory read-wire operations may be located on a separate controller chip and/or on the same substrate as the memory element.

Figure 5:
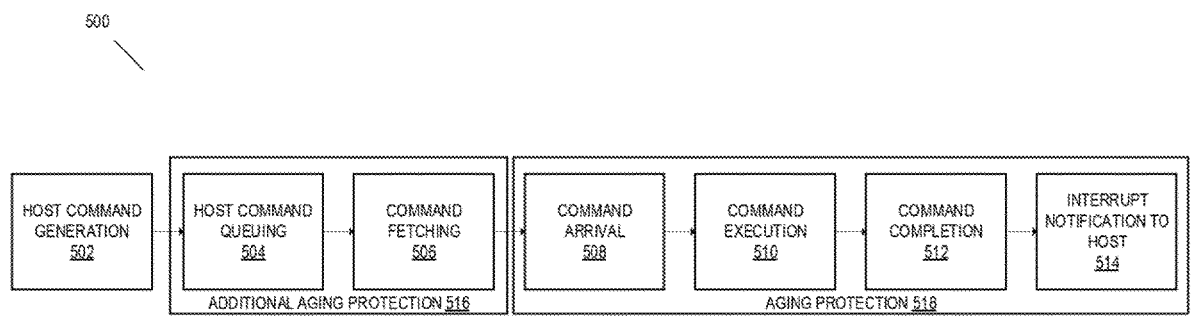
FIG. 5 is a flowchart illustrating the command life cycle and the aging coverage, according to disclosed embodiments.

FIG. 5 is a flowchart illustrating the command life cycle and the aging coverage, according to one embodiment. At block 502, the host, such as the host computer system 300 of FIG. 3, generates a command, such as a read command or a write command, to send to the storage device, such as the device 302 of FIG. 3. The generated command is placed in a host command queue at block 504 until the storage device fetches the generated command at block 506.

After fetching the generated command at block 506, the device controller, such as the device controller 324, receives the generated command at block 508. The device controller executes the command at block 510. When the command has completed at block 512, the device controller sends an interrupt notification to the host at block 514, indicating that the completed command has been placed in a completion queue.

The storage device includes aging protection 518 when the command arrives at block 508. The aging protection 518 includes attaching a first timestamp corresponding to the time of receipt of the first command, where the first timestamp is recorded in a first timestamp register. Prior to the command arrival, the command has already been generated by the host but has not been transferred to the storage device. The aging protection 518 is applicable to the command when the command is received by the storage device. However, by adding additional aging protection 516 to the command when the command has been generated by the host and queued at block 504, the generated command may have a more accurate command age.

Figure 6:
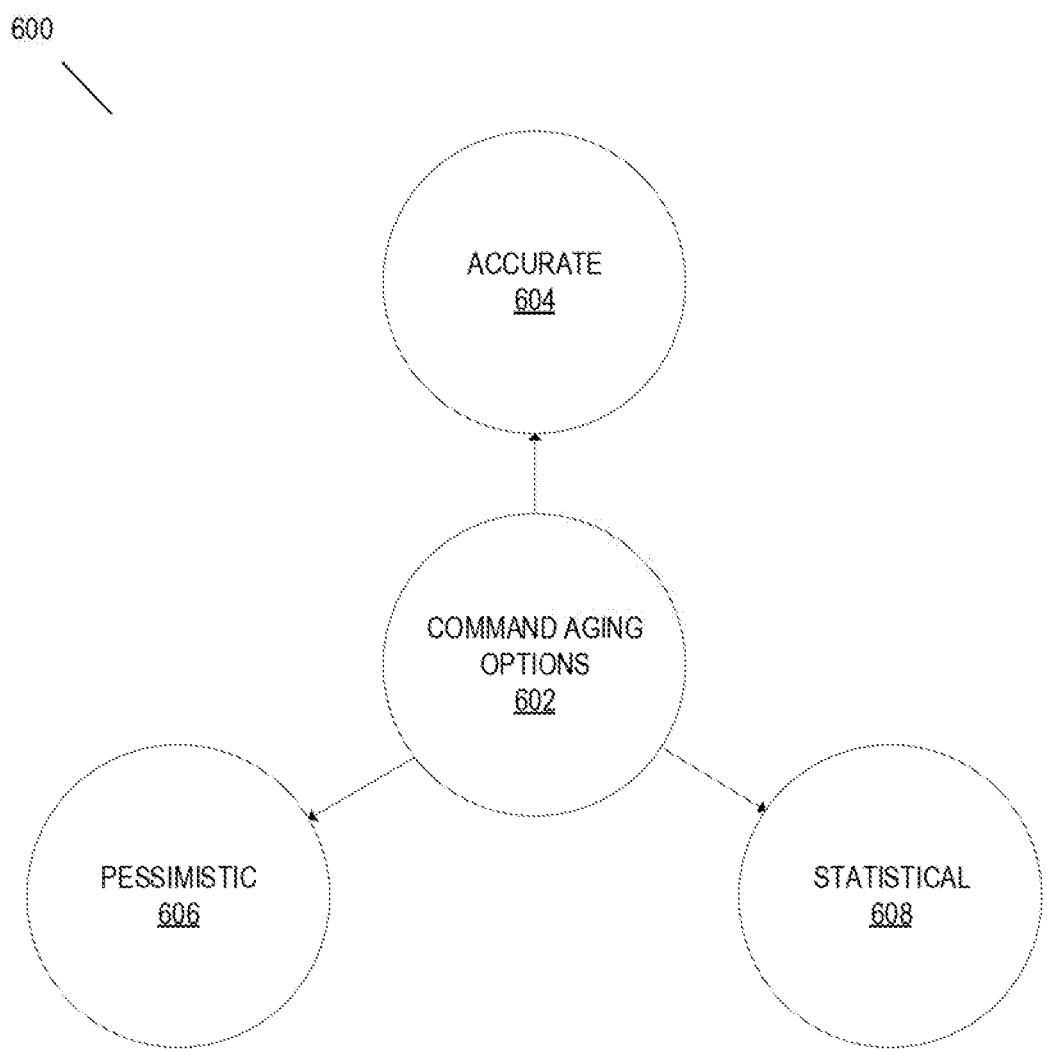
FIG. 6 is a graph illustrating various command aging options, according to disclosed embodiments.

FIG. 6 depicts a graph 600 illustrating various command aging options, according to one embodiment. The various command aging options 602 includes an accurate approach 604, a pessimistic approach 606, and a statistical approach 608. Each of the approaches 604, 606, 608 may be applied to provide additional aging protection for each of the commands while the command has been generated by the host, but has not been fetched by the storage device. The additional aging protection may include the additional aging protection 516 described in FIG. 5.

The accurate approach 604 utilizes an aging mechanism whenever the storage device receives a doorbell. The doorbell represents the host notifying the storage device of a host generated command in the host command queue. When the doorbell is received by the storage device, the storage device fetches the relevant command from the host command queue. The timestamp is attached to the doorbell request and stored within the storage device's memory.

The timestamp associated with the doorbell request may be stored in the volatile controller memory, such as SRAM. When the command is received by the controller, the relevant timestamp associated with the doorbell of the received command is attached to the received command. The timestamp accounts for the time while the relevant command is stored in the host command queue.

Table 2, shown below, illustrates various embodiments of the required memory size to store the timestamp associated with the doorbell for each host generated command. The listed values in the table are not intended to be limiting, but to provide an example of a possible embodiment.

TABLE 2

| Scenario | Number of submission queues | Max queue-depth of each submission queue | Required memory size |
| --- | --- | --- | --- |
| eSSD | 512 | 64K | 512 × 64K × 4 = 128 MB |
| cSSD1 | 256 | 1K | 256 × 1K × 4 = 1 MB |
| cSSD2 | 64 | 256 | 64 * 256 * 4 = 64 KB |

For example, an eSSD may have about 512 submission queues, where each of the submission queues may have a size of about 64K. When each command has about a 4K size, the total required memory to store each timestamp associated with a doorbell is about 128 MB.

In one embodiment, the storage device is placed in a command fetching mode and receives a first command from a host. The first command received by the controller is associated with a first timestamp. The first timestamp reflects the time that the first doorbell was received by the storage device. When the first command is received by the controller, the first timestamp associated with the first doorbell is attached to the first command. Likewise, when the second command is received by the controller, the second timestamp associated with the second doorbell is attached to the second command. Furthermore, a first command may have a higher priority than a second command depending on the age (e.g., an older timestamp). The command with the higher priority may be serviced prior to a command with a lower priority.

The pessimistic approach 606 utilizes a register that holds a timestamp and a counter that counts the number of commands that is associated with a particular timestamp. When the host rings the doorbell for a particular command queue and command fetching is disabled, the command request associated with the doorbell is updated with the value of the current timestamp for the first operation (e.g., the first command). For example, fetching may be disabled in exception flows and when storage device has high priority background operation tasks that cannot be interrupted by host commands. The subsequent pending command requests in the relevant queue are incremented based on the value of the timestamp of the first operation (e.g., the first doorbell). When the data storage device enters a command fetching mode, the commands receive the timestamp associated with the host doorbell requests. By assigning the timestamp associated with the doorbell request, these fetched commands receive some aging protection in that they will be prioritized higher than commands (and command requests) that arrive after the host doorbell.

When receiving the command from the host, the timestamp stored in the relevant timestamp register associated with the command is attached to the received command. The timestamp may be the timestamp associated with the first operation rather than the current timestamp of the received command. The timestamp associated with the first operation may continue to be attached to subsequent pending commands until the fetching of all pending commands during the fetch disable period has been completed. Furthermore, about 6 bytes may be required for each submission queue to account for the timestamp for each command. For example, if the max number of submission queues is about 256, then the total extra volatile memory required may be about 1.5 KB.

In one embodiment, the storage device is placed in a non-command fetching mode and receives a first command from a host. The first command received by the controller is associated with a first timestamp. The first timestamp reflects the time that the first doorbell was received by the storage device. When the first command is received by the controller, the first timestamp associated with the first doorbell is attached to the first command. In the pessimistic approach 606, when the second command is received by the controller, the first timestamp associated with the first doorbell is attached to the second command. In some embodiments, in order to differentiate the priority between the first command and the second command, the timestamp for each subsequent command received after the first command is incremented (e.g., a command counter). For example, a first command may have a priority of "x." When receiving a second command, the second command has a priority of "x+1", though the second command is associated with the first timestamp. The command with the higher priority may be serviced prior to a command with a lower priority.

The statistical approach 608 may be similar to the pessimistic approach 606. However, when receiving a doorbell, the storage device may store multiple timestamps, such that each timestamp may reflect a different position in the command queue. For example, by including several counters and several timestamp registers per queue, the storage device may utilize several timestamps for the queued commands during the command fetch disable period.

In one embodiment, the storage device is placed in a non-command fetching mode and receives a first command from a host. The first command received by the controller is associated with a first timestamp. The first timestamp reflects the time that the first doorbell was received by the storage device. When the first command is received by the controller, the first timestamp associated with the first doorbell is attached to the first command. A second command is received by the controller. The first timestamp associated with the first doorbell is attached to the second command. When a third command is received by the controller, the controller stores a second timestamp associated with the third doorbell in a second register. The second timestamp is attached to the third command. The controller determines a priority for each of the commands received, such that the first command may have a higher priority than the second command received. The second command may have a higher priority than the third command received. Furthermore, instead of utilizing two individual timestamps, the first timestamp and the second timestamp may be averaged together. The averaged timestamp may be utilized for each of the commands received, where each subsequent command is incremented by a command counter.

Figure 7A:
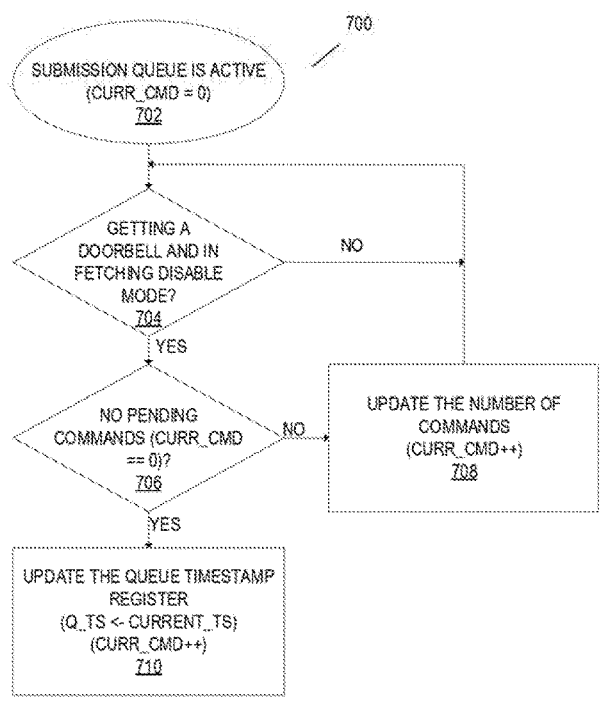
FIG. 7A is a flowchart illustrating the doorbell transactions for command aging, according to disclosed embodiments.

FIG. 7A depicts a flowchart 700 illustrating the doorbell transactions for command aging, according to one embodiment. At block 702, the submission queue is activated, such that the host begins to generate commands. When the submission queue is activated, the current commands in the host command queue is about 0. When the first generated command is placed in the host command queue, the storage device is notified by the doorbell. Furthermore, the command fetching mode is disabled, such that commands are sent from the host to the storage device, rather than the storage device fetching the commands from the host.

At block 704, if the storage device has not received a doorbell notification and the command fetching mode has not been disabled, then the storage device waits until both the doorbell has been received and the command fetching mode has been disabled. At block 704, if the storage device has received a doorbell notification and the command fetching mode has been disabled, the controller of the storage device determines if there are any pending commands in the controller command queue at block 706. If the current commands in the controller command queue are greater than about 0, then the controller updates the number of commands at 708 to the current number of commands in the controller command queue. However, if the current number of pending commands is about 0, then the timestamp register is updated at 710 with the current timestamp to reflect the queue timestamp (e.g., the timestamp associated with the timestamp of the first doorbell of the first command).

Figure 7B:
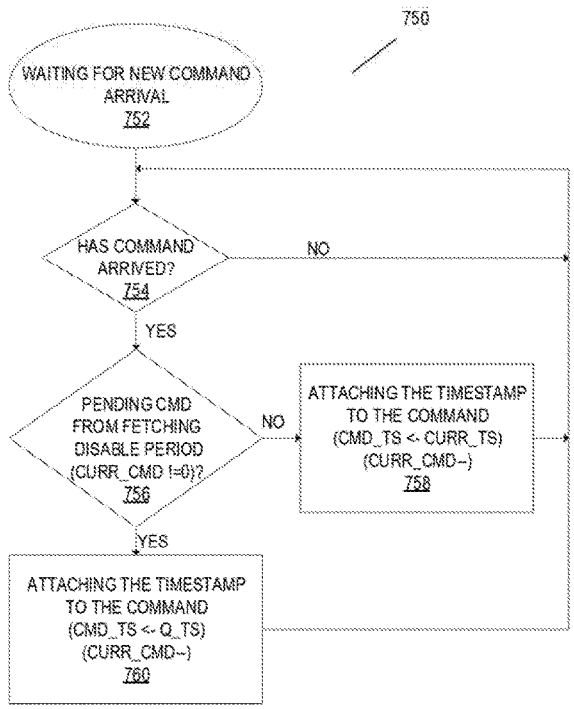
FIG. 7B is a flowchart illustrating the command arrival flow for command aging, according to disclosed embodiments.

FIG. 7B depicts a flowchart 750 illustrating the command arrival flow for command aging, according to one embodiment. At block 752, the storage device is taken out of idle mode, and the controller waits for a new command arrival from the host. The controller may be in a non-command fetching mode, such that commands are transferred from the host to the storage device instead of the storage device fetching the commands from the host. When the controller receives the command at block 754, the controller determines if there are any pending commands from the command fetching disable period at block 756.

If there are no pending commands from the command fetching disable period, then the controller attaches the current timestamp to the command received at block 758. However, if there are pending commands from the command fetching disable period, then the controller attaches the queue timestamp (e.g., the timestamp associated with the timestamp of the first doorbell of the first command) at block 760.

By including an aging mechanism for host generated commands not yet transferred to the storage device, the age of the command may be more accurately recorded. As a result of a more accurate recording of the age of each command, the quality of service may be improved, and the probability for host command timeouts may be reduced.

In one embodiment, a data storage device is disclosed, including one or more memory devices and a controller comprising a first timestamp register, a command queue, and a processor configured to carry out a method for command aging. In embodiments, the method includes placing the data storage device in a non-command fetching mode, receiving a first command from a host, and recording a first timestamp in the first timestamp register corresponding to a time of receipt of the first command.

The method further including placing the data storage device in a command fetching mode, receiving the first command, attaching the first timestamp to the first command, and setting a priority of the first command based on an age of the first timestamp. The controller further includes a command counter. The method further includes receiving of the first command includes receiving a plurality of commands, recording of the first timestamp includes recording the first timestamp in the first timestamp register corresponding to a time of receipt of each one of the plurality of commands, and incrementing the command counter for each respective one of the plurality of commands. The method further includes attaching the first timestamp to each respective one of the plurality of commands and setting a priority of each command of the plurality of commands based on the age of each respective one of the plurality of commands. The controller further includes a second timestamp register. The method further includes setting the second timestamp register at a second time, attaching the first timestamp to a first group of the plurality of commands, and setting a priority of each command of the plurality of commands based on the attached first timestamp and second timestamp of each command of the plurality of commands. The controller further includes a second timestamp register. The method further includes setting the second timestamp register at a second timestamp, generating a plurality of timestamp values from the first timestamp to the second timestamp, attaching each command of the plurality of commands to one of the plurality of timestamp values, and setting a priority of each command of the plurality of commands based on the respective one of the plurality of timestamp values of each command of the plurality of commands. The controller further includes a second timestamp register. The method further includes setting the second timestamp register at a second timestamp, generating an average timestamp time based on the from the first timestamp and second timestamp, attaching one of the first timestamp, the second timestamp, and the average timestamp to each respective one of the plurality of commands, and setting a priority of each command of the plurality of commands based on the respective first timestamp, second timestamp, and average time stamp attached to each command of the plurality of commands. The method further includes attaching the average timestamp to a command that is not the first command to arrive, of the plurality of commands. The method further includes attaching the second time stamp to a command that arrives last, of the plurality of commands.

In another embodiment, a controller for a data storage device is disclosed, including a host I/O, a memory I/O coupling the controller to one or more memories, a first timestamp register, a command queue, and a processor configured to carry out a method for command aging. In embodiments, the method includes placing the data storage device in an idle mode, receiving a first doorbell request from a host, and generating a first timestamp in the first timestamp register corresponding to a time of receipt of the first doorbell request.

The method further includes taking the placing the data storage out of the idle mode, fetching a first command from the host, corresponding to the doorbell request, obtaining the first timestamp from the first timestamp register, and attaching the first timestamp to the first command, and prioritizing the first command based on an age of the first timestamp to a first priority. The controller further includes a command counter. The method further includes receiving the first doorbell requests comprises receiving a plurality of doorbell requests, each doorbell request comprising at least one command, generating the first timestamp comprises generating a plurality of timestamps in the timestamp register, each timestamp of the plurality of timestamps corresponding to a time receipt of each respective one of the plurality of doorbell requests, and incrementing the command counter for each command of each respective one of the plurality of doorbell requests. The method further includes attaching each one of the plurality of timestamps to each command of every respective one of the doorbell requests, prioritizing each command based on the age of each respective one of the plurality of timestamps, and fetching each command from the host, and executing each command based on the prioritizing. The controller further includes a second timestamp register. The method further includes setting the second timestamp register at a second time, setting the first timestamp to a first group of the plurality of commands, setting the second timestamp to a second group of the plurality of commands, prioritizing each command of the plurality of commands based on the first timestamp and second timestamp of each command, and fetching each command from the host, and executing based on the prioritizing. The controller further includes a second timestamp register. The method further includes generating a second timestamp for the second timestamp register at a second timestamp, providing a plurality of timestamps between the first timestamp and the second timestamp, assigning each doorbell request of the plurality of doorbell requests to one of the plurality of timestamps, and prioritizing each command associated with each respective one of the plurality of doorbell requests based on the plurality of timestamps. The controller further includes a second timestamp register. The method further includes generating a second timestamp for the second timestamp register, calculating, using the processor, an average timestamp based on the first timestamp and second timestamp, providing, for each respective one of the plurality of commands, one of the first timestamp, the second timestamp, and the average timestamp, and prioritizing each command of the plurality of commands based on one of the provided first timestamp, second timestamp, and average timestamp, provided to each command. The method further includes providing the average timestamp to at least one command of the plurality of commands that is not the first command. The method further includes providing the second timestamp to at least one command of the plurality of commands that is not the first command.

In another embodiment, a system for storing data is disclosed, including a memory means, and a controller means. In embodiments, the controller means includes a first timestamp register means, a command queue means, and a processor means configured to carry out a method for command aging. In embodiments, the method includes placing the system in a non-command fetching mode, receiving a first command from a host means, and recording a first timestamp in the first timestamp register means corresponding to a time of receipt of the first command.

The method further includes placing the system in a command fetching mode, receiving the first command, attaching the first timestamp to the first command, and setting a priority of the first command based on an age of the first timestamp.

While the foregoing is directed to embodiments of the present disclosure, other and further embodiments of the disclosure may be devised without departing from the basic scope thereof, and the scope thereof is determined by the claims that follow.

What is claimed is:

1. A data storage device comprising:
one or more memory devices; and
a controller comprising a first timestamp register and a command queue, wherein the controller is configured to:
place the command queue in a non-command fetching mode, wherein the command queue includes one or more pending commands;
receive a notification of a first command from a host; and
record a first timestamp in the first timestamp register corresponding to a time of receipt of the notification of the first command, wherein the first timestamp is attached to the first command and a subsequently received command, and wherein the subsequently received command is received after the command queue is transitioned from the non-command fetching mode to a command fetching mode.

2. The data storage device of claim 1, wherein the controller is further configured to:
place the command queue in the command fetching mode;
receive the first command;
attach the first timestamp to the first command in the command queue; and
set a priority of the first command based on an age of the first timestamp.

3. The data storage device of claim 1, wherein the controller further comprises a command counter, and wherein:
receiving the first command comprises receiving a plurality of commands; and
recording the first timestamp comprises:
recording the first timestamp in the first timestamp register corresponding to a time of receipt of each one of the plurality of commands; and
incrementing the command counter for each respective one of the plurality of commands.

4. The data storage device of claim 3, wherein the controller is further configured to:
attach the first timestamp to each respective one of the plurality of commands; and
set a priority of each command of the plurality of commands based on an age of each respective one of the plurality of commands.

5. The data storage device of claim 3, wherein the controller further comprises a second timestamp register, wherein the controller is further configured to:
set the second timestamp register at a second time;
attach the first timestamp to a first group of the plurality of commands;
attach the second timestamp to a second group of the plurality of commands; and
set a priority of each command of the plurality of commands based on the attached first timestamp and second timestamp of each command of the plurality of commands.

6. The data storage device of claim 3, wherein the controller further comprises a second timestamp register, and wherein the controller is further configured to:
set the second timestamp register at a second timestamp;
set a plurality of timestamp values from the first timestamp to the second timestamp;
set each command of the plurality of commands to one of the plurality of timestamp values; and
set a priority of each command of the plurality of commands based on each respective one of the plurality of timestamp values of each command of the plurality of commands.

7. A data storage device comprising:
one or more memory devices; and
a controller comprising a first timestamp register, a command queue, a command counter, and a second timestamp register, wherein the controller is configured to:
  place the data storage device in a non-command fetching mode;
  receive a first command from a host;
  record a first timestamp in the first timestamp register corresponding to a time of receipt of the first command;
  wherein:
    receiving the first command comprises receiving a plurality of commands; and
    recording the first timestamp comprises:
      recording the first timestamp in the first timestamp register corresponding to a time of receipt of each one of the plurality of commands; and
      incrementing the command counter for each respective one of the plurality of commands;
  set the second timestamp register at a second timestamp;
  generate an average timestamp time based on the first timestamp and second timestamp;
  attach one of the first timestamp, the second timestamp, and the average timestamp to each respective one of the plurality of commands; and
  set a priority of each command of the plurality of commands based on the respective first timestamp, second timestamp, and average timestamp attached to each command of the plurality of commands.

8. The data storage device of claim 7, wherein the controller is further configured to attach the average timestamp to a first command of the plurality of commands that is not the first command to arrive.

9. The data storage device of claim 8, wherein the controller is further configured to attach the second timestamp to a second command of the plurality of commands that arrives last.

10. A data storage device, comprising:
a host I/O;
a memory I/O coupling a controller to one or more memories;
a first timestamp register; and
a command queue, wherein the command queue includes one or more pending commands, and wherein the controller is configured to:
  place the data storage device in an idle mode;
  receive a notification of a first command from a host; and
  generate a first timestamp in the first timestamp register corresponding to a time of receipt of the notification, wherein the first timestamp is attached to the first command and a subsequently received command, and wherein the subsequently received command is received after the command queue is taken out of the idle mode.

11. The data storage device of claim 10, wherein the controller is further configured to:
take the data storage device out of the idle mode;
fetch a first command from the host, corresponding to the notification;
obtain the first timestamp from the first timestamp register;
attach the first timestamp to the first command; and
prioritize the first command based on an age of the first timestamp to a first priority.

12. The data storage device of claim 10, wherein the controller further comprises a command counter, and wherein:
receiving the notification comprises receiving a plurality of notifications from the host, each notification being associated with at least one command;
generating the first timestamp comprises generating a plurality of timestamps in the timestamp register, each timestamp of the plurality of timestamps corresponding to a time receipt of each respective one of the plurality of notifications; and
incrementing the command counter for each command of each respective one of the plurality of notifications.

13. The data storage device of claim 12, wherein the controller is further configured to:
attach each one of the plurality of timestamps to each command of every respective one of the notifications;
prioritize each command based on an age of each respective one of the plurality of timestamps;
fetch each command from the host; and
execute each command based on the prioritizing.

14. The data storage device of claim 12, wherein the controller further comprises a second timestamp register, and wherein the controller is further configured to:
set the second timestamp register at a second time;
set the first timestamp to a first group of the plurality of commands;
set the second timestamp to a second group of the plurality of commands;
prioritize each command of the plurality of commands based on the first timestamp and second timestamp of each command;
fetch each command from the host; and
execute each command based on the prioritizing.

15. The data storage device of claim 12, wherein the controller further comprises a second timestamp register, and wherein the controller is further configured to:
generate a second timestamp for the second timestamp register at a second timestamp;
provide a plurality of timestamps between the first timestamp and the second timestamp;
assign each notification of the plurality of notifications to one of the plurality of timestamps; and
prioritize each command associated with each respective one of the plurality of notifications based on the plurality of timestamps.

16. A data storage device, comprising:
a host I/O;
a memory I/O coupling a controller to one or more memories;
a first timestamp register;
a command queue; and
a command counter, wherein the controller is configured to:
  place the data storage device in an idle mode;
  receive a first doorbell request from a host, wherein receiving the first doorbell requests comprises receiving a plurality of doorbell requests, each doorbell request comprising at least one command;
  generate a first timestamp in the first timestamp register corresponding to a time of receipt of the first doorbell request, wherein generating the first timestamp comprises generating a plurality of timestamps in the timestamp register, each timestamp of the plurality of timestamps corresponding to a time receipt of each respective one of the plurality of doorbell requests;

increment the command counter for each command of each respective one of the plurality of doorbell requests;
generate a second timestamp for the second timestamp register;
calculate an average timestamp based on the first timestamp and second timestamp;
provide, for each respective one of the plurality of commands, one of the first timestamp, the second timestamp, and the average timestamp; and
prioritize each command of the plurality of commands based on one of the provided first timestamp, second timestamp, and average timestamp, provided to each command.

17. The data storage device of claim 16, wherein the controller is further configured to provide the average timestamp to at least one command of the plurality of commands that is not the first command.

18. The data storage device of claim 16, wherein the controller is further configured to provide the second timestamp to at least one command of the plurality of commands that is not the first command.

19. A data storage device, comprising:
a memory means; and
a controller coupled to the memory means, the controller comprising:
a first timestamp register; and
a command queue, wherein the command queue includes one or more pending commands, and wherein the controller is configured to:
place the data storage device in a non-command fetching mode;
receive a notification of a first command from a host; and
record a first timestamp in the first timestamp register corresponding to a time of receipt of the notification, wherein the first timestamp is attached to the first command and a subsequently received command, and wherein the subsequently received command is received after the command queue is transitioned from the non-command fetching mode to a command fetching mode.

20. The data storage device of claim 19, wherein the controller is further configured to:
place the data storage device in the command fetching mode;
receive the first command;
attach the first timestamp to the first command; and
set a priority of the first command based on an age of the first timestamp.

* * * * *